United States Patent
Lenard et al.

(10) Patent No.: US 6,329,624 B1
(45) Date of Patent: Dec. 11, 2001

(54) MEASURING DEVICE ON A MACHINE FOR MACHINING WORKPIECES WITH CUTTING TEETH, ESPECIALLY SAW BLADES

(75) Inventors: Peter Lenard, Biberach; Norbert Bailer, Schemmerhofen-Altheim; Rudi Schmucker, Warthausen, all of (DE)

(73) Assignee: Vollmer Werke Maschinenfabrik GmbH, Biberach/Riss (DE)

( * ) Notice: Subject to any disclaimer, the term of this patent is extended or adjusted under 35 U.S.C. 154(b) by 0 days.

(21) Appl. No.: 09/508,426
(22) PCT Filed: Sep. 24, 1998
(86) PCT No.: PCT/EP98/06079
  § 371 Date: Mar. 10, 2000
  § 102(e) Date: Mar. 10, 2000
(87) PCT Pub. No.: WO99/16581
  PCT Pub. Date: Apr. 8, 1999

(30) Foreign Application Priority Data

Oct. 1, 1997 (DE) .............................................. 197 43 528

(51) Int. Cl.⁷ ........................................................ B23H 1/00
(52) U.S. Cl. .......................... 219/69.17; 76/37; 219/69.2
(58) Field of Search ............................... 219/69.2, 69.17; 76/37, 41

(56) References Cited

U.S. PATENT DOCUMENTS

| 4,641,007 | 2/1987 | Lach . | |
| 4,750,387 | * 6/1988 | Swiger | .................................... 76/37 |
| 4,947,015 | * 8/1990 | Lach | .................................... 219/69.2 |
| 4,963,710 | 10/1990 | Lach . | |
| 6,109,137 | * 8/2000 | Lenard et al. | ............................ 76/37 |

FOREIGN PATENT DOCUMENTS 196 30 057 C1  9/1997 (DE) .

* cited by examiner

Primary Examiner—Geoffrey S. Evans
(74) Attorney, Agent, or Firm—Clifford W. Browning; Woodard, Emhardt, Naughton, Moriarty & McNett (57) ABSTRACT

The machine includes a saddle (26) which is displaceable along a spindle axis (E) and transversely thereof under numerical control. A tool spindle (28) is supported on the saddle (26) so as to be driven in rotation about the spindle axis (E) and adapted to be equipped with a disc-shaped tool for cutting work to be done on a workpiece (10). The machine further includes a workpiece slide (42) which is displaceable along the workpiece slide guide (40) under numerical control and carries a workpiece support (44). The tool (30) is embodied by an electrically conductive member of an electric circuit (30, 36, 46, 48, 10) which is closed through the workpiece (10) when this is touched by the tool (30). The tool spindle (28) is adapted to be driven by a motor (84) which can be switched from a rotational operating speed to do cutting work on the workpiece (10) to a rotational measuring speed which is considerably slower. The numerically controlled possibilities of movement, for which the machine is equipped anyway, enable the measuring unit to pick up dimensions required for recognizing and machining workpieces having cutting teeth, especially circular saw blades and to do so in a manner suitable for the numerical control of the machine.

2 Claims, 7 Drawing Sheets

MEASURING DEVICE ON A MACHINE FOR MACHINING WORKPIECES WITH CUTTING TEETH, ESPECIALLY SAW BLADES

The invention relates to a method of controlling a machine provided for machining workpieces which have cutting teeth, especially saw blades, comprising a saddle which is displaceable along a spindle axis and transversely thereof under numerical control, a tool spindle which is supported on the saddle so as to be rotatable about the spindle axis and adapted to be equipped with a disc-shaped tool for machining a workpiece, and a workpiece slide which is displaceable along a workpiece slide guide means under numerical control and carries a workpiece support, the tool spindle being adapted to be driven by a motor at variable rotational speed, and the tool being an electrically conductive member of an electric circuit which controls the machine and is closed through the workpiece when the latter is touched by the tool.

Such a method is known from U.S. Pat. No. 4,963,710. In that case the advance of the tool with respect to the workpiece is made dependent on parameters of a current flowing between the two.

It is the object of the invention to improve such a method in such a way that the numerically controlled possibilities of movement (axes of movement), for which the machine is equipped anyway, will permit the dimensions required for recognizing and machining workpieces having cutting teeth, especially circular saw blades, to be picked up in a manner suitable for the numerical control of the machine, without presenting a risk of a tooth tip to be sensed becoming damaged.

Starting from a method of the kind defined, the object is met, in accordance with the invention, by the fact that, for sensing the workpiece by means of the tool, the tool spindle is driven at a rotational measuring speed which is reduced considerably as compared to a rotational operating speed normally used for machining the workpiece. The rotational measuring speed preferably lies in the order of magnitude between one and ten per cent of the rotational operating speed.

An embodiment of the invention will be described in greater detail below with reference to diagrammatic drawings, in which.

The example shown of a workpiece 10 to be machined on the machine illustrated is a circular saw having hard metal trimmed cutting teeth 12, each to be machined at its tooth face 14 and its tooth back 16 while its tooth tip 18 remains precisely in a predetermined position.

The machine illustrated comprises a machine bed 20 on which an elongate guide body 22 is supported for swinging adjustment about a pivot axis A which is horizontal in the embodiment shown. The pivot axis A is defined as the line of intersection of a vertical first reference plane B and a horizontal second reference plane C. A lift axis D extends along the guide body 22, intersecting the pivot axis A at a right angle and presenting the axis of back and forth movement of a reciprocating slide 24. A saddle 26 is guided on the reciprocating slide 24 for infeed movement along a spindle axis E which intersects the lift axis D at right angles and extends perpendicularly to the pivot axis A, when in the normal position illustrated. The saddle 26 is adapted to be positioned obliquely about the lift axis D in both directions, departing from the normal position illustrated. The saddle 26 is adjusted obliquely about the lift axis D in accordance with the inclination of the tooth face 14 or tooth back 16 in the event that there are teeth, among the cutting teeth 12 to be machined, of which the tooth face 14 or the tooth back 16 does not extend parallel to the pivot axis A, as illustrated in the drawing.

Figure 1:
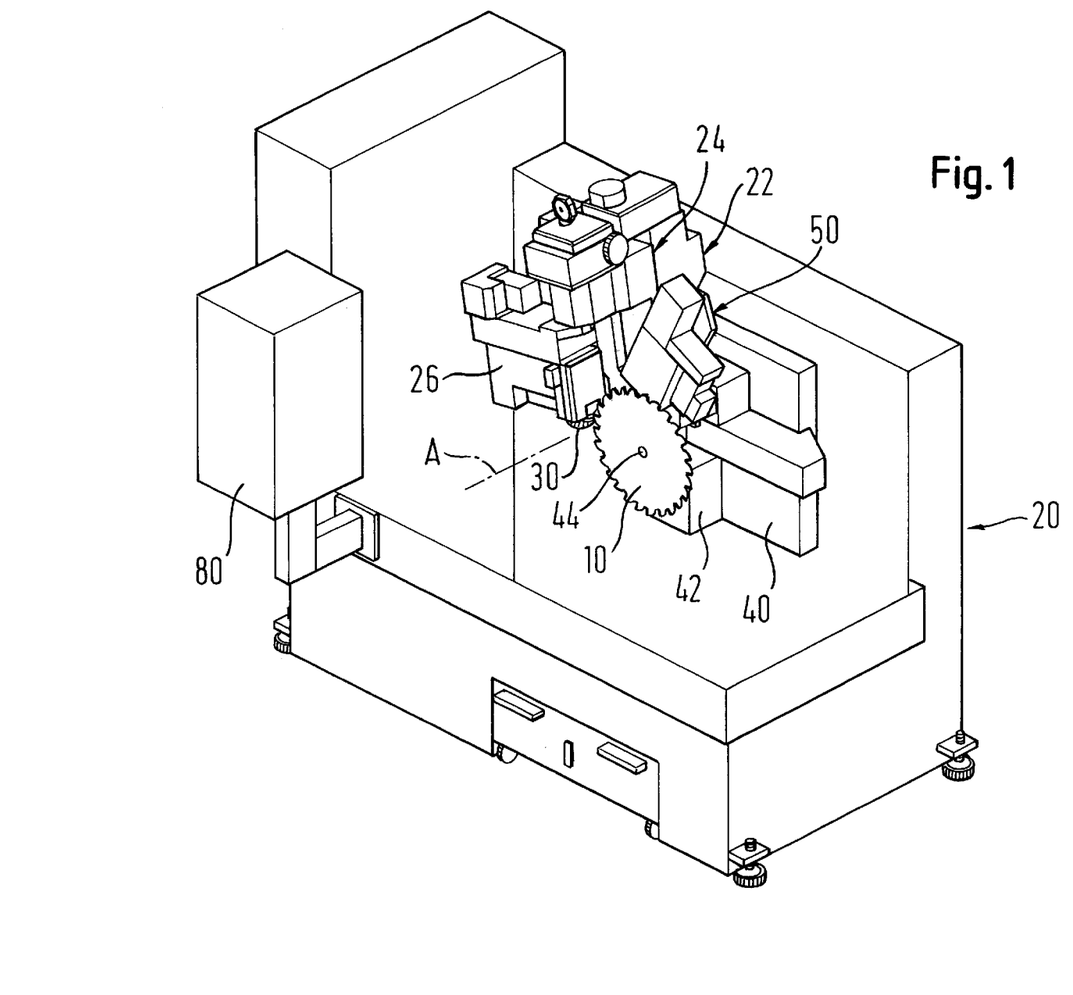
FIG. 1 shows a numerically controlled machine for grinding saw blades, in an oblique view.
Figure 2:
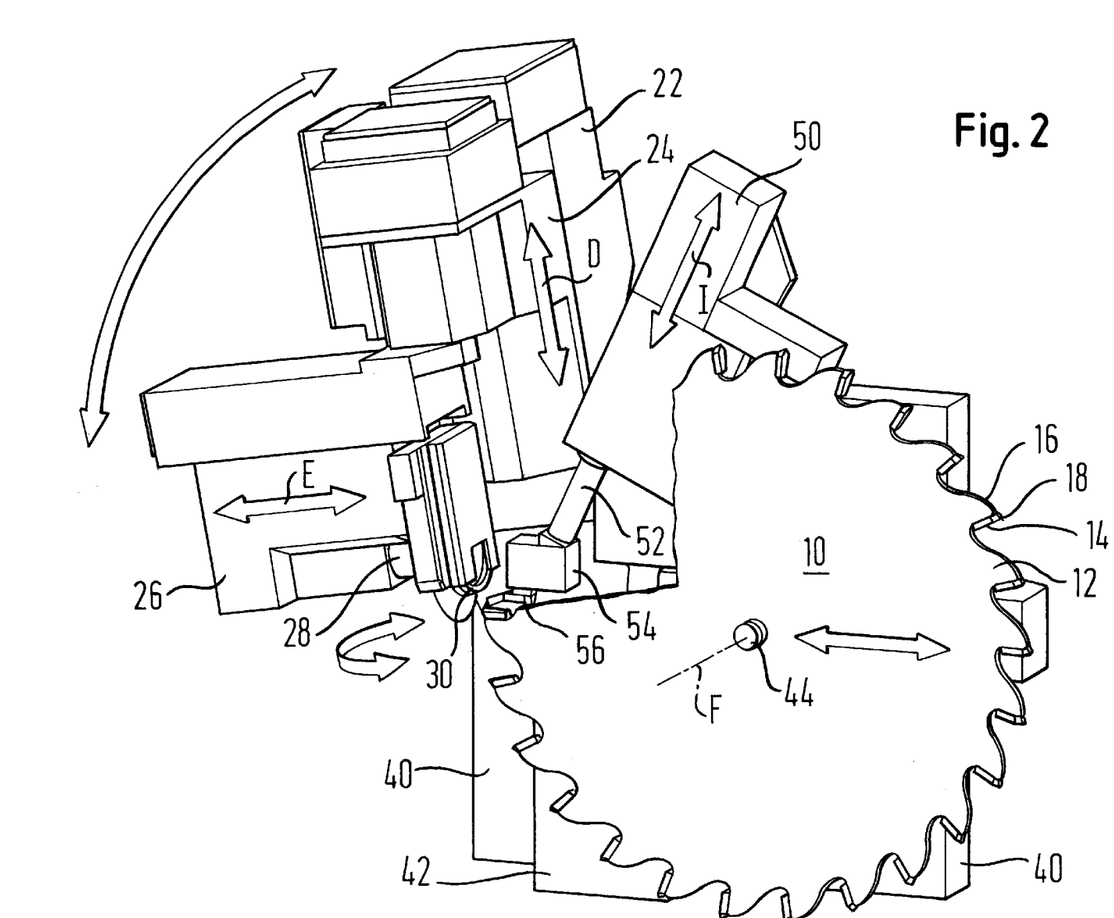
FIG. 2 shows an enlarged cutout of FIG. 1, in a slightly altered direction of view, adjusted to grind the backs of teeth.
Figure 3:
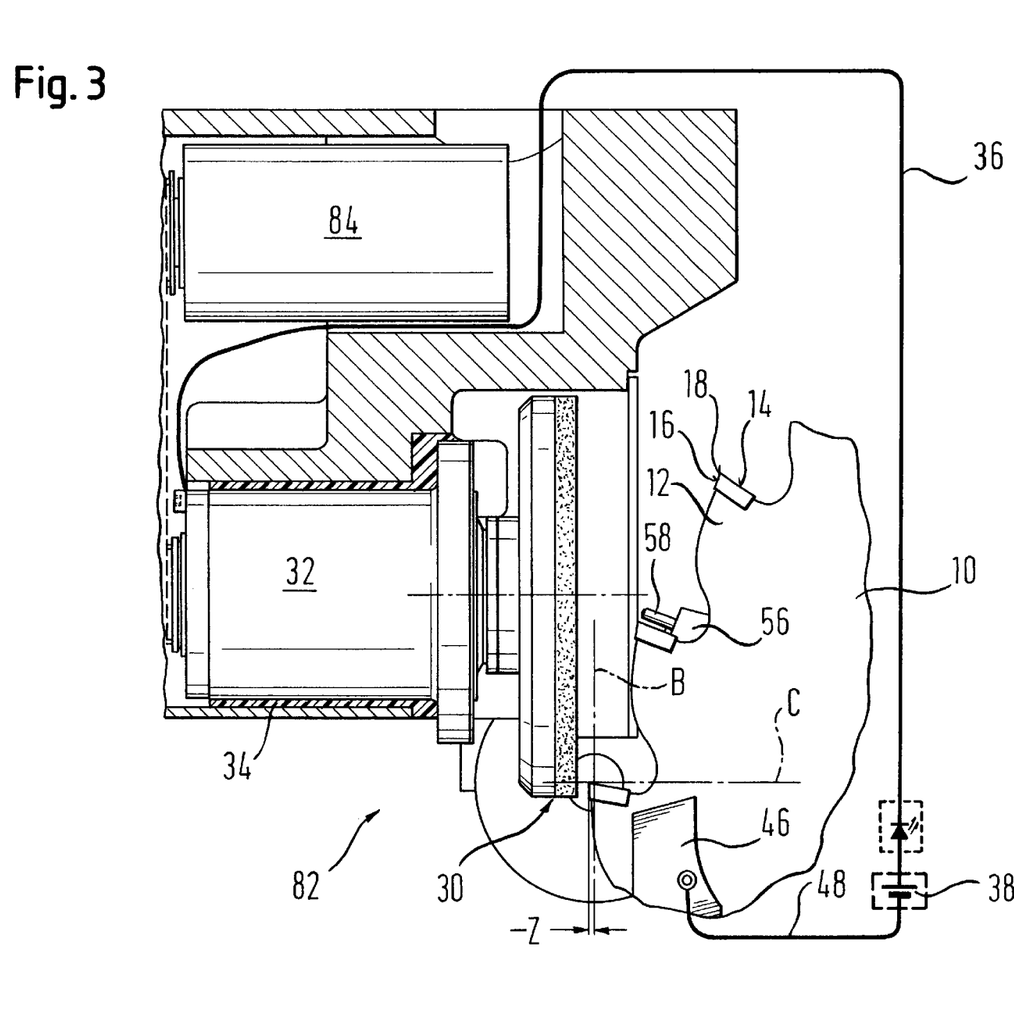
FIG. 3 shows another cutout, as seen from the front, and enlarged still further.
Figure 9:
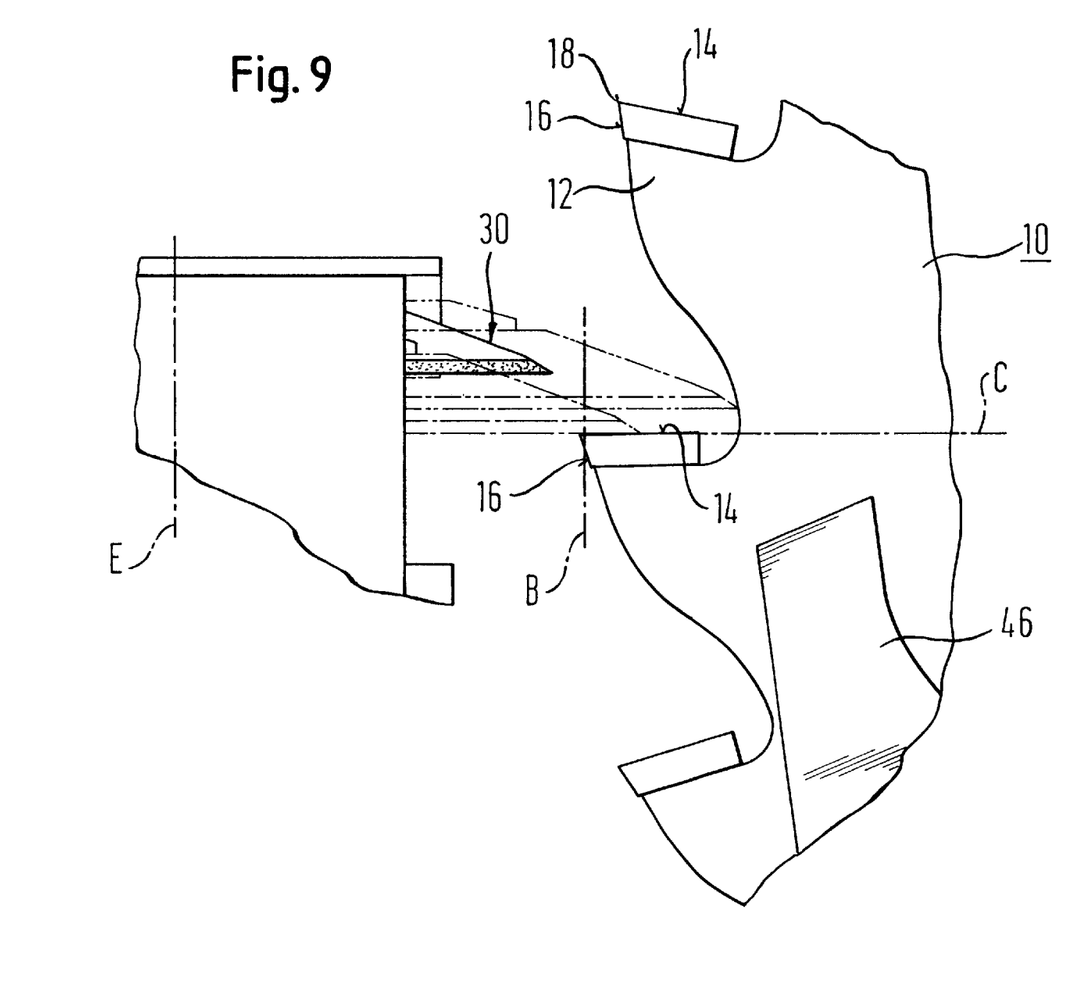
FIG. 9 shows an elevation of the machine similar to FIG. 3, equipped and adjusted to grind tooth faces.

The spindle axis E is the axis of a tool spindle 28 which is supported on the saddle 26 and adapted to be driven in rotation. A tool 30 for machining the workpiece 10 may be fastened to the tool spindle 28. FIG. 2 presents the tool 30 as a known type of combination of grinding discs, including a cup-shaped grinding disc and a plate-shaped grinding disc, both being interconnected back to back. For simplicity, the tool 30 is depicted in FIGS. 3 and 5 to 8 merely as a cup-shaped grinding disc, whereas FIG. 9 presents it as only a plate-shaped grinding disc. These grinding discs or the grinding disc combination also may be replaced by an erosion disc or a combination of two erosion discs serving as the tool 30 for spark erosion machining of workpieces.

The tool spindle 28 is supported in a bearing box 32 retained on the s addle 26 in electrically insulated manner through an insulation sleeve 34 and connected to a power source 38 by an electric line 36.

A horizontal workpiece slide guide means 40, which is stationary in the embodiment illustrated, is disposed at the front of the machine bed 20 so as to extend at right angles to the pivot axis A. A workpiece slide 42 carrying a workpiece support 44 is movable along the workpiece slide guide means 40. In the embodiment shown, which includes a circular saw blade as workpiece 10, the workpiece support 44 comprises a peg defining an axis of rotation F for the workpiece 10 in parallel with the pivot axis A. The workpiece 10 is centered on this peg. For machining of the cutting teeth 12, the workpiece slide 42 must adopt an operative position as shown in FIGS. 1 to 3, 8, and 9 at which a circular line around the axis of rotation F on which lie the tooth tips 18 of the workpiece 10, will intersect the pivot axis A. As a consequence, the workpiece 10 can be rotated in steps into machining positions such that one tooth tip 18 each will be located on the pivot axis A.

The central plane G of the workpiece 10 extending perpendicularly to the axis of rotation F, in other words vertically in the embodiment shown, is arranged such that it contains the lift axis D. In this position, the workpiece 10 is clamped between two jaws 46 of a clamping means. The tooth tip 18 of the cutting tooth 12 to be machined is located at a point H at which the pivot axis A passes through the central plane G. The clamping means essentially is of conventional design, yet it includes the special feature of having one of the jaws 46 connected to the power source 38 by an electric line 48 so that an electric circuit is closed when the workpiece 10 is contacted by the tool 30.

To effect the stepwise advancing movements of the workpiece 10, being rotational motion in the embodiment illustrated, the machine shown comprises an advance means 50 including a rod 52 which is adapted to be extended in controlled fashion along a feed axis I and carries an advance head 54 at its end. At the advance head 54, a cross slide 56 carrying an advance finger 58 is guided for displacement parallel to the pivot axis A. The cross slide 56 normally is in inoperative position, with the advance finger 58 remote from the central plane G. It is only when a movement to advance the workpiece is to be carried out that the cross slide 56 is shifted, parallel to the pivot axis A, into a position at which the advance finger 58 enters into the tooth gap in front of the next cutting tooth 12 to be machined and, by extending the rod 52, presses against the tooth face 14 of this tooth to push it into the position described at which the tooth tip 18 coincides with point H.

Figure 4:
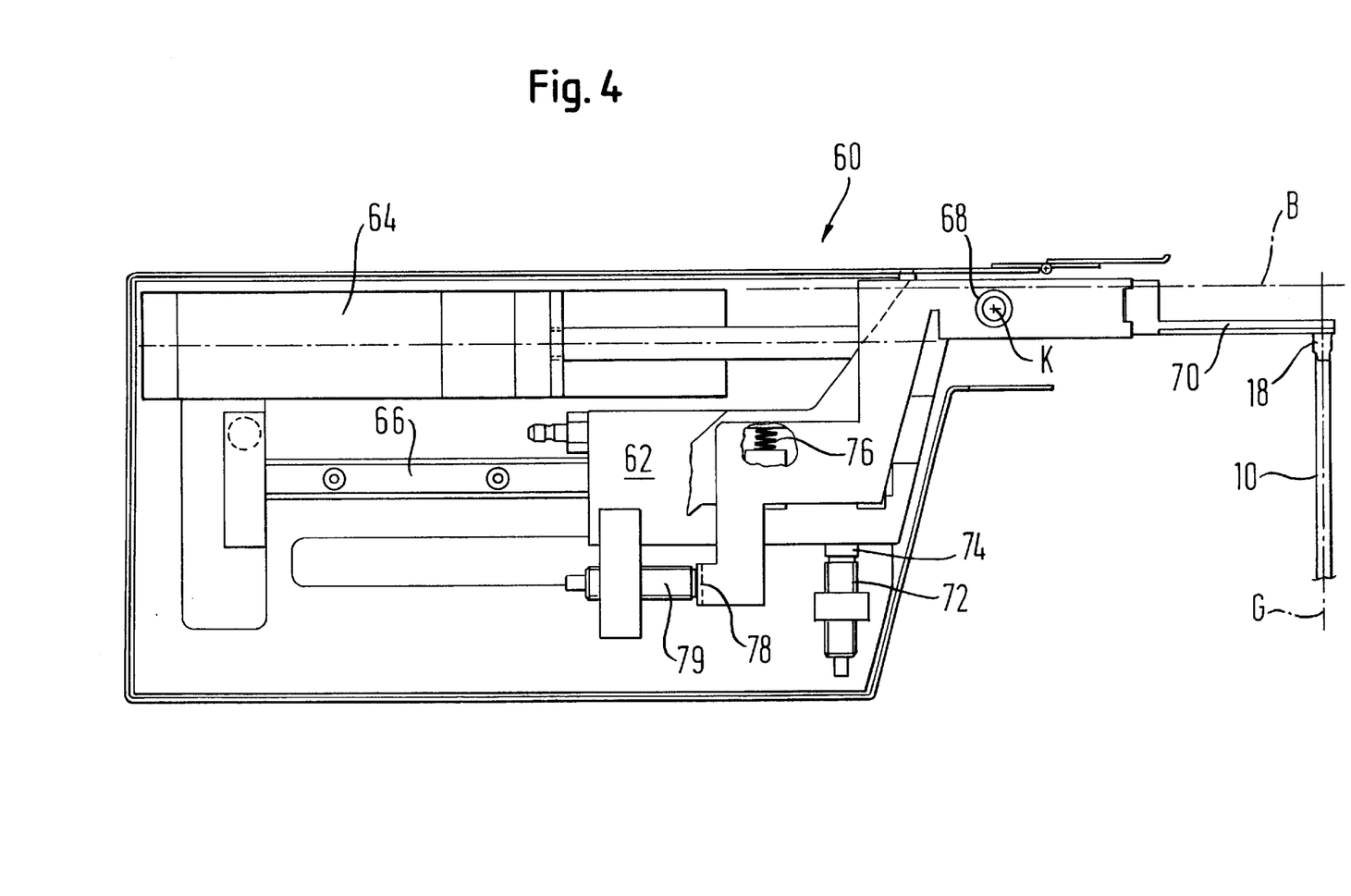
FIG. 4 shows a top plan view of a sensing means of the machine.
Figure 5:
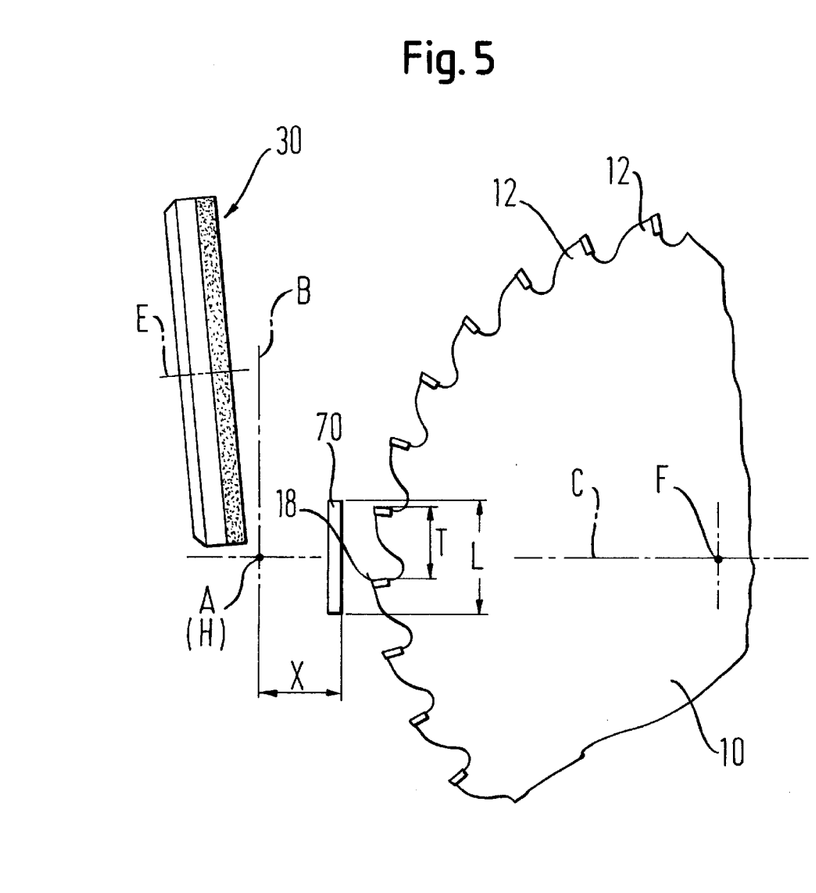
FIGS. 5 to 8 show consecutive operating positions of the machine, depicted in partial views similar to FIG. 3.

In the embodiment illustrated, the advance means 50 is controlled such that it will repeat this procedure on the next successive cutting tooth 12 so that it will be this tooth which finally stops at the position described in order then to be machined once the tool 10 has been clamped between the jaws 46. It may happen that the advance finger 58 does not engage in a tooth gap of the workpiece 10 as soon as the advance means 50 has been turned on because it was not ascertained, when donning the workpiece 10 and subsequently pushing forward the workpiece slide 42, that indeed the tooth tip 18 of the first cutting tooth 12 to be machined already was located in the second reference plane C. Therefore, the following measures are provided in order to ultimately guarantee that:

The machine comprises the sensing means 60 illustrated in FIG. 4 which, as may be seen, comprises a sensing slide 62 adapted to reciprocate between a position of rest and the sensing position shown in FIG. 4, by means of an hydraulic or pneumatic piston and cylinder unit 64, along a linear guide means 66 which extends parallel to the pivot axis A and thus perpendicular to the central plane G. A barrier 70 is supported on the sensing slide 62 through a joint 68, the joint 68 defining an axis of rotation K parallel to the central plane G as well as the first reference plane B, thus being vertical in the embodiment shown. The barrier 70 extends parallel to the first reference plane B and is supported in front thereof, being spaced from the same by a distance X. And the barrier has a length L, as measured in the central plane G, which is longer than that the greatest tooth pitch T occurring with workpieces 10 to be machined. These relationships, demonstrated in FIG. 5, make sure that the forward movement of the workpiece slide 42 with a workpiece 10 donned on its workpiece support 44 will be interrupted when the foremost tooth tip 18 projecting farthest out has reached distance X from the second refrence plane C.

Figure 6:
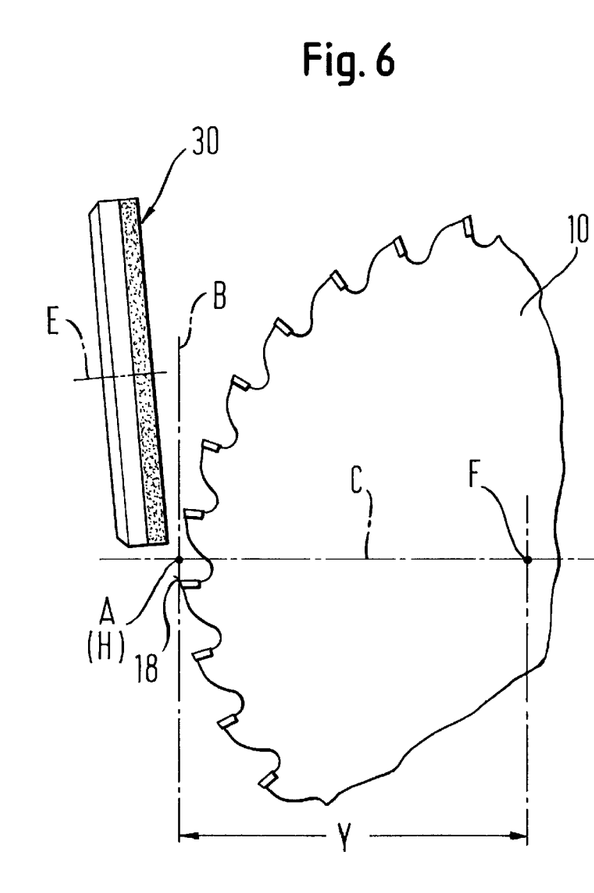
Figure 7:
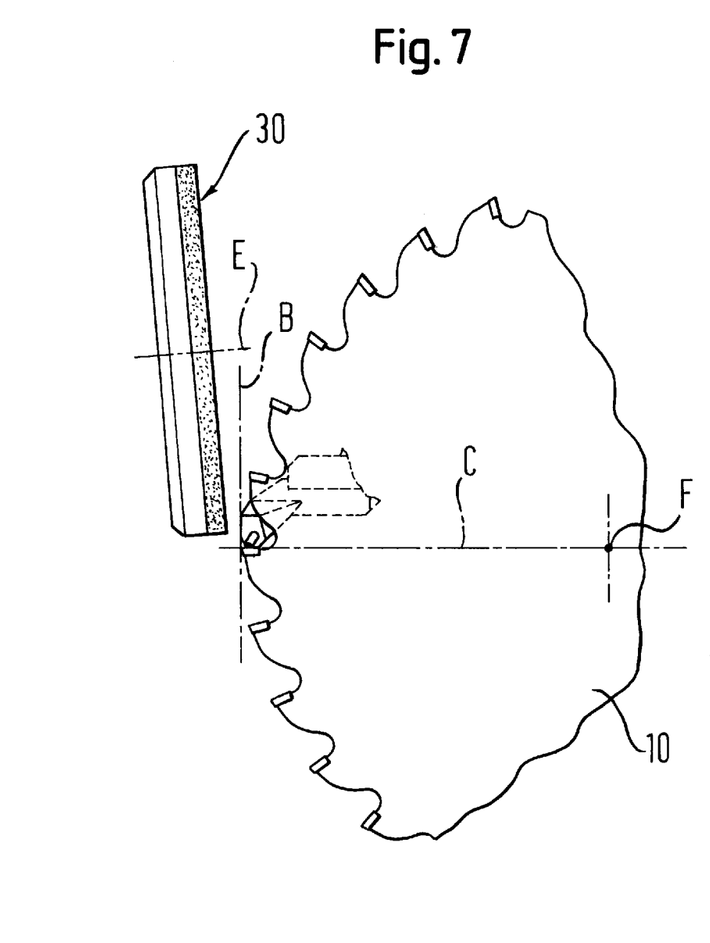
Figure 8:
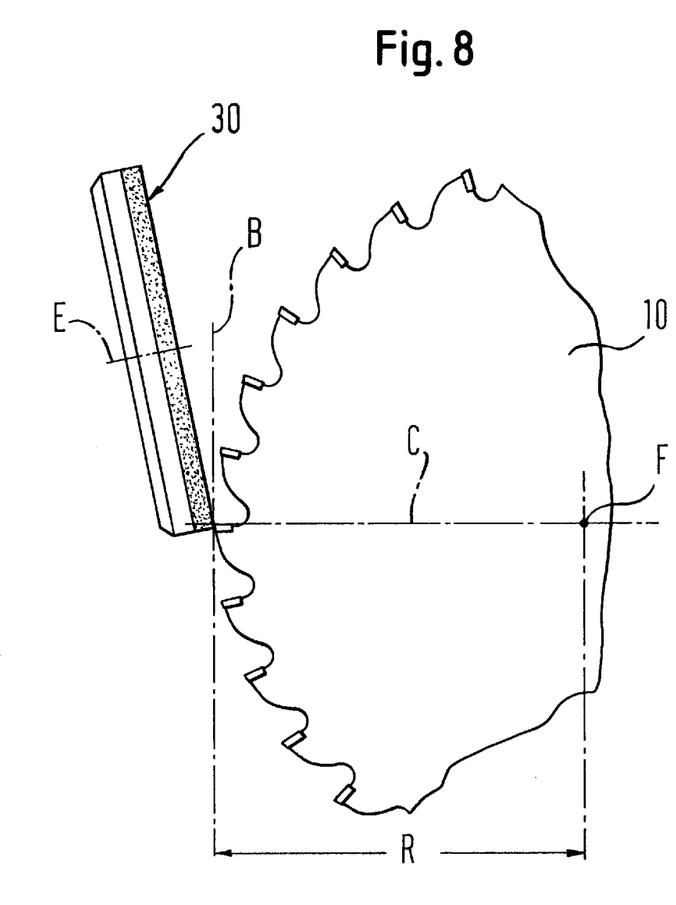

The sensing slide 62 carries a switch 72, embodied by an electroinductive limit switch in the embodiment shown. A stationary stop 74 is associated with the switch. Just like the reciprocating slide 24 and the saddle 26, the workpiece slide 42 is numerically controlled and cannot be set into motion, upon donning of a workpiece 10 to be machined on the workpiece support 44, until the switch 72 has signaled that the sensing slide 62 has been extended and, therefore, the barrier 70 has reached its sensing position, as illustrated in FIG. 4. The barrier 70 normally is held by a spring 76 in the position shown, i.e. in parallel with the first reference plane B. Being hit by a tooth tip 18, however, it swings around pivot axis K, whereby a switch contact 78 connected to the barrier 70 is moved to actuate a proximity switch 79. The latter applies a signal to the numerical control 80 of the machine, whereupon the forward movement of the workpiece slide 42 is interrupted. Then the piston and cylinder unit 64 is actuated and consequently the sensing slide 62 together with the barrier 70 are retracted into the inoperative position of the sensing means 60. That opens the way for the workpiece 10, and the workpiece slide 42 is advanced by distance X so that the tooth tip 18 which had hit the barrier 70 will reach the second reference plane B, as shown in FIG. 6, coming to lie, coincidentally, more or less far above or below the second reference plane C, i.e. still not being located at the point of intersection H.

Now the advance means 50 is actuated in the manner described and the result, ultimately, will be that one tooth tip 18 lies in the second reference plane C. Yet the tooth tip 18 has not remained in the first reference plane B due to the movement just carried out along a circular arc. Instead, it has passed beyond it by a distance –Z (minus Z) which, although minute, cannot be tolerated for machining. This distance must be determined by renewed sensing of the tooth tip 18 and corrected.

To carry out that renewed sensing, the tool 30 adapted to be driven in rotation is drawn upon, i.e. the cup-shaped or the plate-shaped grinding disc in the embodiment shown. The tool 30 is electrically conductive and, therefore, it can close an electrical circuit including the electric lines 36 and 48 and the power source 38. Damage to the tooth tip 18 to be sensed is avoided by not driving the tool 30 at its normal rotational operating speed when it is employed for sensing. For grinding the rotational operating speed usually is in the range of from 3000 to 5000 r.p.m.; for sensing the rotational speed, for example, is from 50 to 300 r.p.m., in other words in the order of magnitude of between 1% and 10% of the rotational operating speed. To accomplish that, the tool 30 is driven by an electric motor 84 which is fed in per se known manner through a frequency converter. The slow rotational speed provided for sensing is sufficient to spin off cutting emulsion, dirt, and the like from the tool 30 and, moreover, assures that minor wobbling motions or any crumbling of the tool 30 will not affect the sensing accuracy.

Thus the tool 30 is advanced by means of the saddle 26 until the tool slightly touches the tooth tip 18 facing it, whereby the circuit fed by the power source 38 will be closed through the workpiece 10. That releases a signal causing the control 80 to compare the position adopted by the workpiece slide 42 with the position which the workpiece slide 42 held when the workpiece 10 hit the barrier 70, based on which position an approximation value Y characterizing the workpiece 10 had been calculated, in the case of a circular saw blade this being the approximate radius thereof. If it is determined, upon renewed sensing of the workpiece 10, that its tooth tip 18 now located in the second reference plane C extends beyond the first reference plane B by a distance Z, the workpiece slide 42 is retracted by said distance Z and, as a result, the tooth tip 18 then will lie on the pivot axis A. The precise radius R of the workpiece 10 results from the equation R=Y+Z.

The measuring procedure described is repeated in case the workpiece 10 includes roughing and smoothing teeth of different tooth depths in order for a decisive radius or diameter of the workpiece 10 to be determined for each of the two types of teeth.

The principle of sensing an electrically conductive workpiece 10 by means of a tool 30 which likewise is electrically conductive can be utilized for a variety of measurements. As illustrated in FIG. 9, for example a plate-shaped grinding disc provided as tool 30 may be used to sense the depth of a tooth gap of the workpiece 10 in a numerically controlled movement of the reciprocating slide 24 and, furthermore, to control the position of the tooth face 14 by infeed movement of the saddle 26.

If there is a risk of inaccuracies in the positioning of the workpiece 10 resulting from the fact that the workpiece slide 42 is moved back and forth in the manner described, it is possible to design the distance X to be shorter than shown. In that event, the frontmost tooth tip 18 in FIGS. 5 and 6 will not yet reach the first reference plane B when the workpiece slide 42 is moved, as described, by distance X. And even after the incremental movement of the workpiece 10 by which this tooth tip 18 gets into the second reference plane C, there still remains a distance +Z to be covered before the tooth tip 18, finally, will reach the first reference plane B as well and thus lie on the pivot axis A. The distance +Z can be determined and corrected in a manner corresponding to that of distance −Z (FIG. 3) by carrying out sensing with the tool 30 in its capacity as part of a measuring and correcting means 82.

What is claimed is:

1. A method of controlling a machine provided for machining saw blades and other workpieces (10) which have cutting teeth (12), comprising a saddle (26) which is displaceable along a spindle axis (E) and transversely thereof under numerical control, a tool spindle (28) which is supported on the saddle (26) so as to be rotatable about the spindle axis (E) and adapted to be equipped with a disc-shaped tool (30) for machining a workpiece (10), and a workpiece slide (42) which is displaceable along a workpiece slide guide means (40) under numerical control and carries a workpiece support (44), the tool spindle (28) being adapted to be driven by a motor (84) at variable rotational speed, and the tool (30) being an electrically conductive member of an electric circuit (30, 36, 46, 48, 10) which controls the machine and is closed through the workpiece (10) when the latter is touched by the tool (30), characterized in that, for sensing of the workpiece (10) by the tool (30), the tool spindle (28) is driven at a rotational measuring speed which is reduced considerably as compared to a rotational operating speed normally used for machining the workpiece (10).

2. The method as claimed in claim 1, characterized in that the rotational measuring speed lies between one and ten percent of the rotational operating speed.

* * * * *